United States Patent
Milam

(10) Patent No.: US 8,260,783 B2
(45) Date of Patent: Sep. 4, 2012

(54) STORAGE OF MULTIPLE, RELATED TIME-SERIES DATA STREAMS

(75) Inventor: Christopher Patrick Milam, Lake Forest, CA (US)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 12/036,676

(22) Filed: Feb. 25, 2008

(65) Prior Publication Data

US 2008/0208890 A1 Aug. 28, 2008

Related U.S. Application Data

(60) Provisional application No. 60/904,099, filed on Feb. 27, 2007.

(51) Int. Cl.
*G06F 7/00* (2006.01)
*G06F 17/30* (2006.01)

(52) U.S. Cl. .......... 707/741; 707/790; 707/821; 702/45; 702/50; 702/85; 702/108

(58) Field of Classification Search ............. 707/999.01, 707/741, 790, 821; 709/204; 369/47.1; 702/45, 702/50, 85, 108
See application file for complete search history.

(56) References Cited

U.S. PATENT DOCUMENTS

| | | | |
|---|---|---|---|
| 5,412,774 A | 5/1995 | Agrawal et al. |
| 5,414,809 A | 5/1995 | Hogan et al. |
| 5,487,141 A | 1/1996 | Cain et al. |
| 5,519,866 A | 5/1996 | Lawrence et al. |
| 5,566,330 A | 10/1996 | Sheffield |
| 5,632,022 A | 5/1997 | Warren et al. |
| 5,760,770 A | 6/1998 | Bliss et al. |
| 5,764,226 A | 6/1998 | Consolatti et al. |
| 5,787,283 A | 7/1998 | Chin et al. |
| 5,825,361 A | 10/1998 | Rubin et al. |
| 5,864,862 A | 1/1999 | Kriens et al. |
| 5,907,704 A | 5/1999 | Gudmundson et al. |
| 5,917,498 A | 6/1999 | Korenshtein |
| 5,958,012 A | 9/1999 | Battat et al. |

(Continued)

FOREIGN PATENT DOCUMENTS

WO 03/062934 A1 7/2003

(Continued)

OTHER PUBLICATIONS

"Communication: European Search Report", dated Apr. 24, 2012, for European Patent No. 08003459.8-1239/1965316, 9pgs.

*Primary Examiner* — Giovanna Colan
(74) *Attorney, Agent, or Firm* — Buckley, Maschoff & Talwalkar LLC

(57) ABSTRACT

A method and system may receive time-series data of each of a plurality of real-time data streams from one or more sensors and create an electronic file based on the plurality of real-time data streams. The plurality of real-time data streams comprises a primary data stream, a low limit data stream, a high limit data stream, and a target value data stream. The electronic file includes a data portion and a metadata portion. The metadata portion of the electronic file comprises, for each of the plurality of data streams, one or more data stream identifiers, a time range, a source type, and a data type, and the data portion comprises the time-series data of each of the plurality of real-time data streams.

29 Claims, 5 Drawing Sheets

U.S. PATENT DOCUMENTS

| | | | |
|---|---|---|---|
| 5,970,476 A | 10/1999 | Fahey | |
| 5,980,096 A | 11/1999 | Thalhammer-Reyero | |
| 5,982,362 A | 11/1999 | Crater et al. | |
| 5,991,534 A | 11/1999 | Hamilton et al. | |
| 5,999,940 A | 12/1999 | Ranger | |
| 6,002,853 A | 12/1999 | de Hond | |
| 6,003,036 A | 12/1999 | Martin | |
| 6,014,138 A | 1/2000 | Cain et al. | |
| 6,029,181 A | 2/2000 | Milakovich et al. | |
| 6,122,664 A | 9/2000 | Boukobza et al. | |
| 6,178,362 B1 | 1/2001 | Woolard et al. | |
| 6,198,480 B1 | 3/2001 | Cotugno et al. | |
| 6,223,182 B1 | 4/2001 | Agarwal et al. | |
| 6,246,410 B1 | 6/2001 | Bergeron et al. | |
| 6,247,020 B1 | 6/2001 | Minard | |
| 6,262,729 B1 | 7/2001 | Marcos et al. | |
| 6,263,339 B1 | 7/2001 | Hirsch | |
| 6,282,697 B1 | 8/2001 | Fables et al. | |
| 6,301,584 B1 | 10/2001 | Ranger | |
| 6,307,546 B1 | 10/2001 | Wickham et al. | |
| 6,336,138 B1 | 1/2002 | Caswell et al. | |
| 6,381,605 B1 | 4/2002 | Kothuri et al. | |
| 6,407,761 B1 | 6/2002 | Ching et al. | |
| 6,429,882 B1 | 8/2002 | Abdelnur et al. | |
| 6,430,565 B1 | 8/2002 | Berger et al. | |
| 6,463,352 B1 | 10/2002 | Tadokoro et al. | |
| 6,477,434 B1 | 11/2002 | Wewalaarachchi et al. | |
| 6,480,836 B1 | 11/2002 | Colby et al. | |
| 6,490,719 B1 | 12/2002 | Thomas | |
| 6,505,205 B1 | 1/2003 | Kothuri et al. | |
| 6,505,246 B1 | 1/2003 | Land et al. | |
| 6,505,247 B1 | 1/2003 | Steger et al. | |
| 6,543,046 B1 | 4/2003 | Lunt | |
| 6,609,123 B1 | 8/2003 | Cazemier et al. | |
| 6,643,555 B1 | 11/2003 | Eller et al. | |
| 6,643,691 B2 | 11/2003 | Austin | |
| 6,687,761 B1 | 2/2004 | Collins et al. | |
| 6,700,590 B1 | 3/2004 | DeMesa et al. | |
| 6,704,743 B1 | 3/2004 | Martin | |
| 6,751,657 B1 | 6/2004 | Zothner | |
| 6,842,774 B1 | 1/2005 | Piccioni | |
| 6,952,705 B2 | 10/2005 | Knoblock et al. | |
| 6,996,566 B1 | 2/2006 | George et al. | |
| 7,069,514 B2 | 6/2006 | DeMesa et al. | |
| 7,133,865 B1 | 11/2006 | Pedersen et al. | |
| 7,275,024 B2 | 9/2007 | Yeh et al. | |
| 7,478,128 B2 | 1/2009 | Helmstetter et al. | |
| 7,523,111 B2 | 4/2009 | Walmsley | |
| 7,689,579 B2 | 3/2010 | DeMesa et al. | |
| 7,698,292 B2 | 4/2010 | DeMesa et al. | |
| 7,814,123 B2 | 10/2010 | Nguyen et al. | |
| 7,840,607 B2 | 11/2010 | Henigman et al. | |
| 2001/0001851 A1 | 5/2001 | Piety et al. | |
| 2001/0040591 A1 | 11/2001 | Abbott et al. | |
| 2002/0099499 A1 | 7/2002 | Takayama et al. | |
| 2002/0169867 A1 | 11/2002 | Mann et al. | |
| 2002/0184610 A1 | 12/2002 | Chong et al. | |
| 2002/0186248 A1 | 12/2002 | Ramanathan et al. | |
| 2002/0198679 A1 | 12/2002 | Victor et al. | |
| 2002/0198978 A1 | 12/2002 | Watkins | |
| 2003/0020703 A1 | 1/2003 | Holub | |
| 2003/0055832 A1 | 3/2003 | Roccaforte | |
| 2003/0058277 A1 | 3/2003 | Bowman-Amuah | |
| 2003/0105857 A1 | 6/2003 | Kamen et al. | |
| 2003/0120627 A1 | 6/2003 | Emery et al. | |
| 2003/0139968 A1 | 7/2003 | Ebert | |
| 2003/0163329 A1 | 8/2003 | Bolene | |
| 2004/0036716 A1 | 2/2004 | Jordahl | |
| 2004/0059436 A1 | 3/2004 | Anderson et al. | |
| 2004/0117393 A1 | 6/2004 | DeMesa et al. | |
| 2004/0162834 A1 | 8/2004 | Aono et al. | |
| 2004/0215626 A1 | 10/2004 | Colossi et al. | |
| 2004/0220972 A1 | 11/2004 | Bhattacharjee et al. | |
| 2004/0243281 A1 | 12/2004 | Fujita et al. | |
| 2005/0021622 A1 | 1/2005 | Cullen | |
| 2005/0044097 A1 | 2/2005 | Singson et al. | |
| 2005/0065910 A1 | 3/2005 | Welton et al. | |
| 2005/0071749 A1 | 3/2005 | Goerke et al. | |
| 2005/0143969 A1 | 6/2005 | DeMesa et al. | |
| 2005/0144154 A1 | 6/2005 | DeMesa et al. | |
| 2005/0172306 A1 | 8/2005 | Agarwal et al. | |
| 2005/0182709 A1 | 8/2005 | Belcsak et al. | |
| 2005/0216555 A1 | 9/2005 | English et al. | |
| 2005/0228861 A1* | 10/2005 | Nagayama et al. | 709/204 |
| 2005/0234920 A1* | 10/2005 | Rhodes | 707/10 |
| 2005/0246627 A1 | 11/2005 | Sayed | |
| 2005/0251571 A1 | 11/2005 | Karstens | |
| 2005/0265162 A1* | 12/2005 | Tsubakihara | 369/47.1 |
| 2006/0031250 A1 | 2/2006 | Henigman et al. | |
| 2006/0067334 A1 | 3/2006 | Ougarov et al. | |
| 2006/0074505 A1 | 4/2006 | Kline, Jr. | |
| 2006/0116994 A1 | 6/2006 | Jonker et al. | |
| 2006/0123019 A1 | 6/2006 | Nguyen et al. | |
| 2006/0136583 A1 | 6/2006 | Helmstetter et al. | |
| 2006/0161597 A1 | 7/2006 | Ougarov et al. | |
| 2006/0187713 A1 | 8/2006 | Weetman | |
| 2006/0200741 A1 | 9/2006 | DeMesa et al. | |
| 2006/0218116 A1 | 9/2006 | O'Hearn et al. | |
| 2006/0218131 A1 | 9/2006 | Brenes et al. | |
| 2006/0294199 A1 | 12/2006 | Bertholf | |
| 2007/0038889 A1 | 2/2007 | Wiggins et al. | |
| 2007/0118599 A1 | 5/2007 | Castanho et al. | |
| 2007/0124209 A1 | 5/2007 | Walker et al. | |
| 2007/0208574 A1 | 9/2007 | Zheng et al. | |
| 2007/0239741 A1 | 10/2007 | Jordahl | |
| 2008/0103786 A1 | 5/2008 | Zhang et al. | |
| 2010/0223296 A1 | 9/2010 | Angus et al. | |

FOREIGN PATENT DOCUMENTS

| | | |
|---|---|---|
| WO | 2006/018738 A1 | 2/2006 |
| WO | 2006/039760 A1 | 4/2006 |

* cited by examiner

STORAGE OF MULTIPLE, RELATED TIME-SERIES DATA STREAMS

CLAIM OF PRIORITY

This application is based on, and hereby claims benefit of and priority to, U.S. Provisional Patent Application Ser. No. 60/904,099 filed on Feb. 27, 2007, the contents of which are incorporated herein in their entirety for all purposes.

BACKGROUND OF THE INVENTION

1. Field of the Invention

The present invention relates generally to storage of streaming data.

2. Description of the Related Art

Industrial processes (e.g., manufacturing, material processing, production, power generation, fabrication, and refining) generate a high volume of real-time time-series data. Conventional data collection systems, such as relational databases, may not be capable of handling the volume and/or rate at which the data is generated. Process historians, such as supervisory control and data acquisition ("SCADA") systems or distributed control systems ("DCS"), may therefore be used to collect industrial process data.

Collection of industrial process data typically requires proprietary technology tailored to the particular configuration of the industrial process. The interdependency between data collection and industrial configuration may hinder subsequent analysis of the stored data. In this regard, effective interpretation of the collected data may be difficult without intimate knowledge of the industrial process from which the data was generated. Furthermore, accurate analysis of time-series data may require the creation of a duplicate system to ensure accurate sensor readings, which is cost prohibitive.

SUMMARY

Generally, a method and a system are provided to receive time-series data of each of a plurality of real-time data streams from one or more sensors and create an electronic file based on the plurality of real-time data streams. The plurality of real-time data streams comprises a primary data stream, a low limit data stream, a high limit data stream, and a target value data stream. The electronic file includes a data portion and a metadata portion. The metadata portion of the electronic file comprises, for each of the plurality of data streams, one or more data stream identifiers, a time range, a source type, and a data type, and the data portion comprises the time-series data of each of the plurality of real-time data streams.

DETAILED DESCRIPTION

Figure 1:
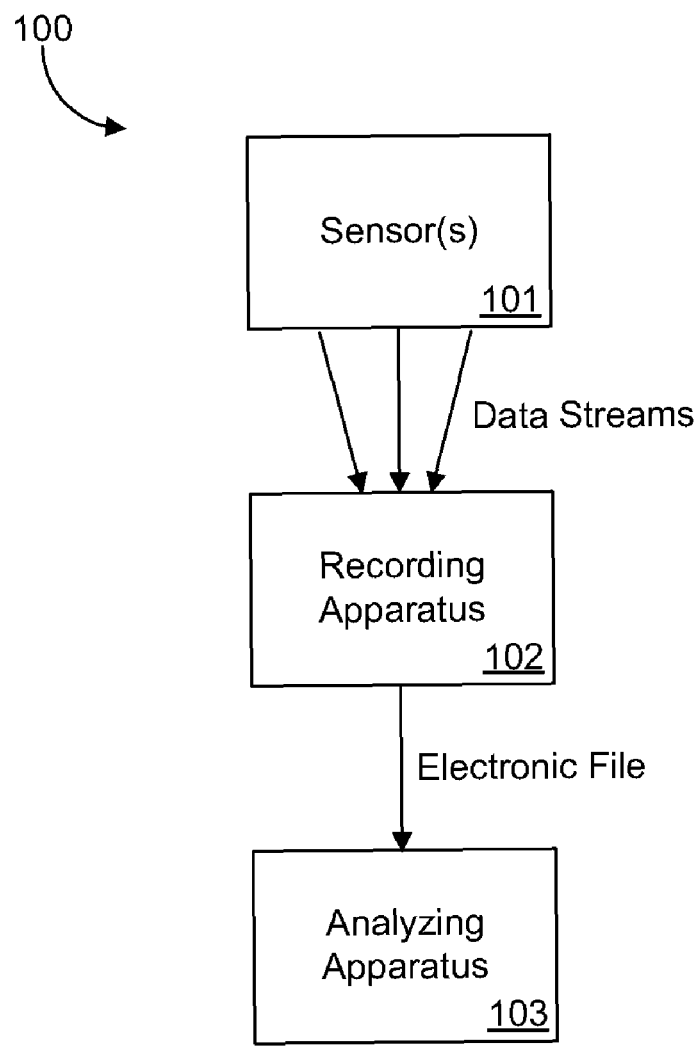
FIG. 1 illustrates a system according to some embodiments.

Now referring to FIG. 1, an embodiment of a system 100 is illustrated. The system 100 may comprise one or more sensors 101, a receiving apparatus 102, and an analyzing apparatus 103.

The one or more sensors 101 may transmit real-time time-series data associated with a single device and/or process. In some embodiments, multiple sensors 101 may sense and transmit time-series data associated with a single device or monitored process such as, but not limited to, a pump flow rate, a fluid level and a level of viscosity. The real-time data may include a plurality of data steams such as, but not limited to, a primary data stream representing a measured value, a low limit data stream representing a low limit of the measured value, a high limit data stream representing a high limit of the measured value, and/or a target value data stream representing a target of the measured value. In some embodiments, the real-time data may comprise multiple levels of limits. For example the real-time data may comprise a plurality of ascending high limit streams and a plurality of descending low limit streams (e.g. a High-High limit and a Low-Low limit).

The real-time data may comprise an indication of one or more alarms, such as, but not limited to a rate-of-change alarm indicator, or a deviation alarm indicator. In some embodiments, an alarm may comprise a status indicator that may have either the value NORMAL or ALARM. For example of an alarm may indicate a "water tank full" light which may require intervention from an operator. In response to a change in the status indicator, a system may trigger one or more system alarm messages that may be recorded and/or sent to the operator. The system alarm message may comprise a value of the status indicator.

The sensor(s) 101 may comprise hardwired sensors coupled to a control system (not shown) and/or to the recording apparatus 102. In some embodiments, the one or more sensors 101 may comprise one or more wireless sensors that transmit real-time time-series data to the recording apparatus 102. One or more of the sensor(s) 101 may be located at an industrial process site and may be integrated with an industrial device (e.g., a pump, etc.)

In some embodiments, the recording apparatus 102 may receive time-series data of each of a plurality of real-time data streams from the one or more sensors 101. The recording apparatus 102 may also receive one or more annotations associated with one or more of the plurality of real-time data streams. In some embodiments, annotations may be user-entered. In some embodiments annotations may be system generated. For example, artificial intelligence programs or other such mechanisms that monitor a process may generate textual commentary. The recording apparatus 102 may create an electronic file including a data portion and a metadata portion based on the plurality of real-time data streams. The metadata portion of the electronic file may include, for each of the plurality of data streams, one or more data stream identifiers, a time range, a source type, and a data type. The data portion may include the received time-series data of each of the plurality of real-time data streams and, optionally, the one or more annotations. The recording apparatus 102 may then transmit the electronic file to the analyzing apparatus 103.

The metadata portion of the electronic file may provide the analyzing apparatus 103 with information to facilitate the application of trend charting or other analysis tools to the time-series data of the data portion. Accordingly, in some embodiments, the analyzing apparatus 103 may plot charts or determine problems in signals without extensive knowledge of the system from which the time-series data was received. In some embodiments, the analyzing apparatus 103 may also display the time-series data of one or more of the plurality of data streams in conjunction with any annotations that were provided in the electronic file.

Figure 2:
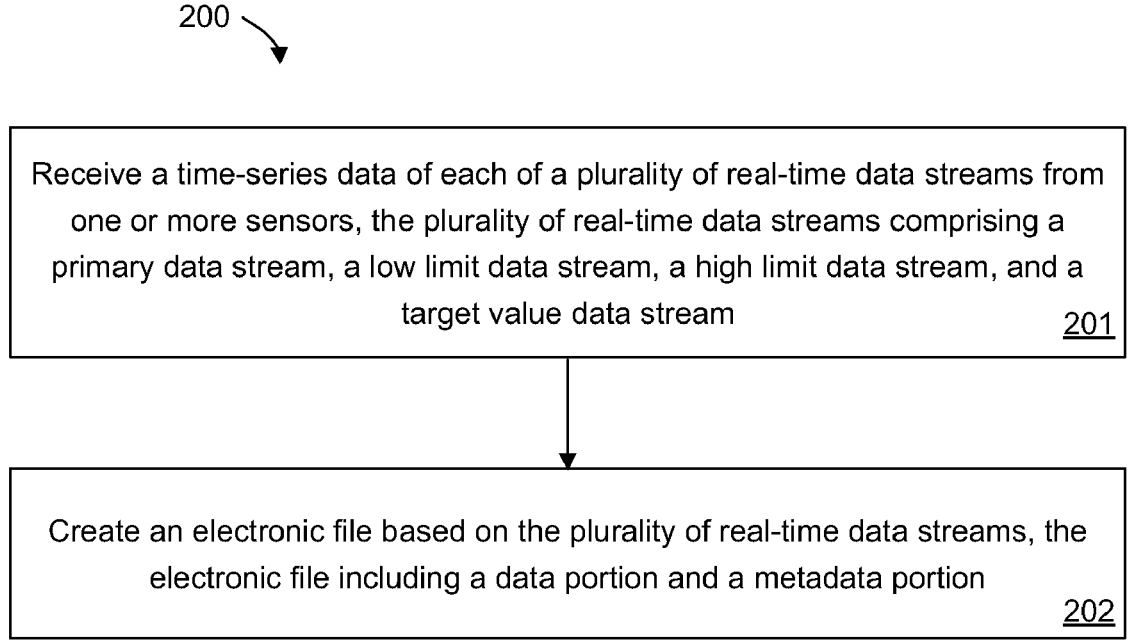
FIG. 2 illustrates a method according to some embodiments.

Now referring to FIG. 2, an embodiment of a method 200 is illustrated. Method 200 may be performed by a system, such as, but not limited to, system 100 of FIG. 1. At 201, a plurality of real-time data streams comprising a primary data stream, a low limit data stream, a high limit data stream, and a target value data stream are received from one or more sensors. In some embodiments, the plurality of real-time data streams may be received at an input of a recording apparatus, such as, but not limited to, input 301 of FIG. 3.

For illustrative purposes, and to aid in understanding FIG. 2, an example will now be introduced. This example is not intended to limit the scope of the appended claims.

A water tank may be deployed in an industrial process and monitored by one or more sensors. One of these sensors may monitor a fill level of the water tank. The sensor may therefore output several streams of time-series data associated with the fill level of the water tank.

One of the data streams may represent the actual fill level of the water tank and is referred to below as a primary data stream. Other data streams may represent a high limit of the fill level, a low limit of the fill level, and a target value of the fill level. In some embodiments, any of the low limit, the target value, and the high limit may change during operation of the industrial process. Accordingly, the primary data stream, the low limit data stream, the high limit data stream, and the target value data stream are received from the sensor at 201.

Next, at 202, an electronic file is created based on the plurality of real-time data streams. The electronic file includes a data portion and a metadata portion. The data portion of an electronic file may comprise the time-series data of each of the plurality of real-time data streams. In some embodiments, the time-series data of a data stream may include a plurality of time stamps and a data value associated with each time stamp for all data points collected over a time range. The data portion may also comprise a plurality of quality levels. A quality level of a data stream may vary over time and thus, each of the plurality of quality levels may be associated with both a time stamp and a respective one of the plurality of received data streams.

The metadata portion may comprise descriptive data (i.e., metadata) associated with the plurality of data streams. The metadata portion of the electronic file may comprise, for each of the plurality of data streams, one or more data stream identifiers, a time range, a source type, and a data type.

In some embodiments, the electronic file may comprise a flat file, a data file, a packetized data stream, or any known data encapsulating structure. The electronic file may be stored in any storage medium such as, but not limited to a hard drive, a flash drive, or a random access memory drive. For example, the electronic file may be stored in storage 303 or memory 306 of FIG. 3.

During execution of an industrial process, a user may enter an annotation into a recording apparatus, such as apparatus 102, to document process-related information. An annotation may comprise alphanumeric characters or symbols. Each annotation may be associated with one or more of the plurality of data streams and may be associated with a particular time stamp or time range. Each annotation may further comprise a locale (i.e., language) identifier and/or an author (i.e., a user, machine, or system identifier). The annotation may be stored in the data portion of the electronic file, and in some embodiments, the metadata portion may comprise an annotation locator index to define a location of each annotation. The annotation index may associate one or more annotations with one or more data streams and a respective time stamp.

Continuing with the above water tank example, the data portion of the electronic file created at 202 may comprise time-series data of the primary data stream, the low limit data stream, the high limit data stream, and the target value data stream. The metadata portion of the electronic file may comprise descriptive data associated with the received data streams. For example, the primary data stream may be identified as "PD", the low limit data stream may be identified as "LL", the high limit data stream may be identified as "HL", and the target data stream may be identified as "TD". If more than one water tank exists, then each data stream may be associated with a specific water tank identifier (e.g., source type) and a specific water tank controller. An identifier may comprise any alphanumeric character or combination thereof.

During the time range represented by the time-series data, a user may have entered in an annotation such as "pump malfunction" or "ice blockage in line" to disclose information that may be pertinent to future analysis of the data streams. The annotation may be associated with a time stamp an included in the data portion.

Figure 3:
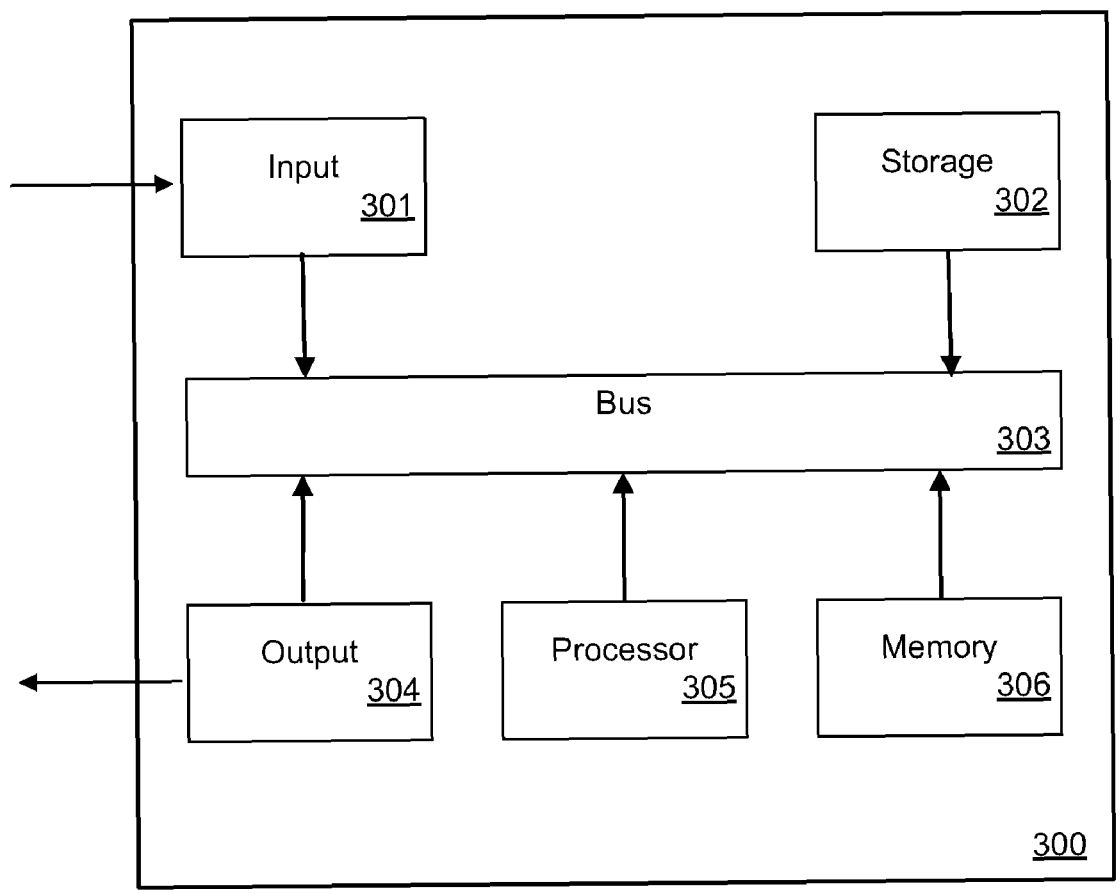
FIG. 3 illustrates a recording apparatus according to some embodiments.

Now referring to FIG. 3, an embodiment of a recording apparatus 300 is illustrated. The recording apparatus 300 may comprise an input 301, storage 302, a bus 303, an output 304, a processor 305, and a memory 306. The input 301 may comprise a receiver to receive a plurality of data streams. In some embodiments, the input 301 may be electrically coupled to one or more sensors, and, in some embodiments, the input 301 may comprise a wireless receiver.

The storage 302 may comprise, but is not limited to, a hard drive, cache memory or flash memory to buffer or store the plurality of data streams. In some embodiments, the storage 302 may comprise a medium to store processor-executable instructions that may cause apparatus 300 to perform a method when executed by the processor 305. In some embodiments, the method may comprise, but is not limited to, method 200 of FIG. 2. The processor 305 may comprise any computer processor that is or becomes known.

The bus 303 may comprise a subsystem to transfer data between various elements of the recording apparatus 300. The output 304 may be used to transfer an electronic file to an analyzing apparatus, such as the analyzing apparatus 103 of FIG. 1. The memory 306 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

Figure 4:
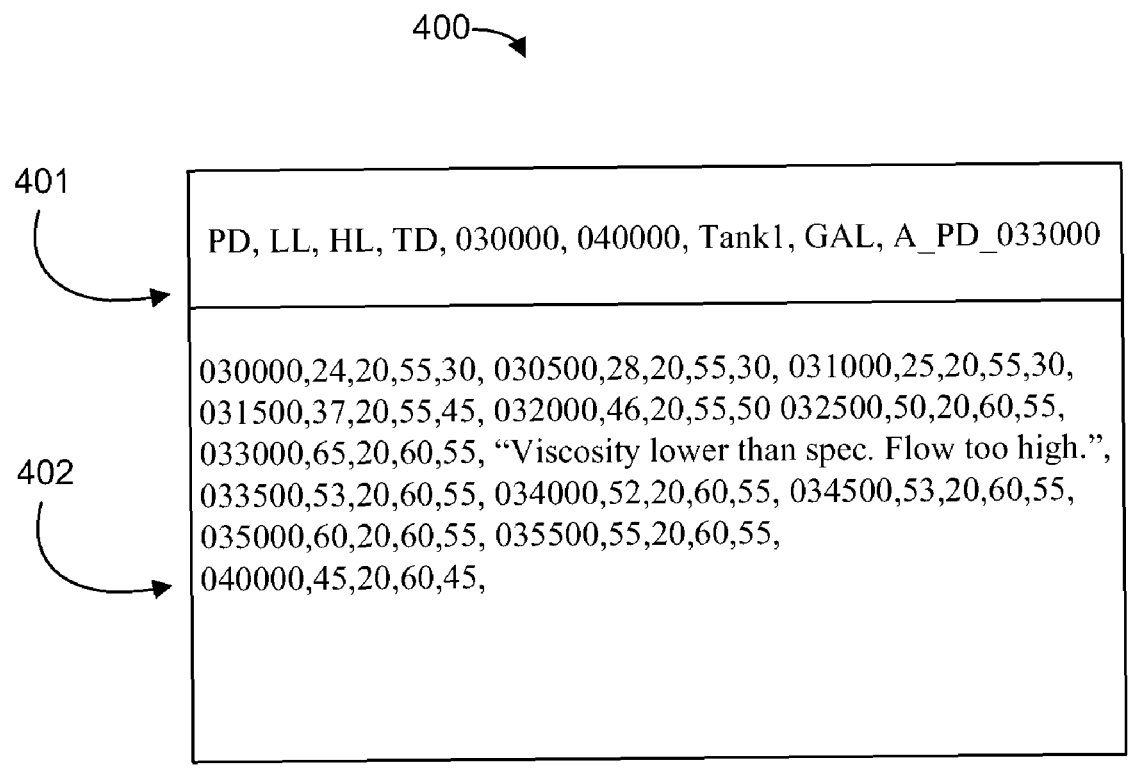
FIG. 4 illustrates an electronic file according to some embodiments.

FIG. 4 illustrates an embodiment of an electronic file 400 created at 202 according to some embodiments. The electronic file 400 may comprise a metadata portion 401 and a data portion 402. The electronic file 400 may take the form of a flat file, a data file, a packetized data stream, or any known data-encapsulating structure. For example, the electronic file 400 may comprise a flat file that contains comma-delimited, tab-delimited, or space-delimited data. In some embodiments, the electronic file 400 may comprise a packetized data stream with a packet header comprising the metadata portion 401 and a packet body comprising the data portion 402.

As shown, the metadata portion 401 comprises metadata of "PD, LL, HL, TD, 030000, 040000, Tank1, GAL, A_PD_033000". Values "PD, LL, HL, TD" may represent stream identifiers for a primary data stream "PD", a lower limit data stream "LL", a high limited data stream "HL", and a target data stream "TD". The order of the stream identifiers may represent an order of data stored in the data portion 402. The metadata portion 401 may further indicate a time range of the sample data (i.e., 03:00:00 to 04:00:00), a source identifier (i.e., Tank1), a data type (i.e., gallons), and an annotation index (i.e., A_PD_033000), that indicates an annotation associated with the primary data stream at time 03:30:00.

The data portion 402, as shown, may include data associated with a plurality of data streams recorded at five-minute intervals. For example, "032500,50,20,60,55," may represent a time stamp associated with time 03:25:00, a primary data value, a lower limit value, a high limit value, and a target value each recorded at 03:25:00. At a next time interval (i.e., time 03:30:30), and as indicated in the metadata portion 401, an annotation was recorded to reflect a primary data value 65 exceeding a high limit value of 60.

Figure 5:
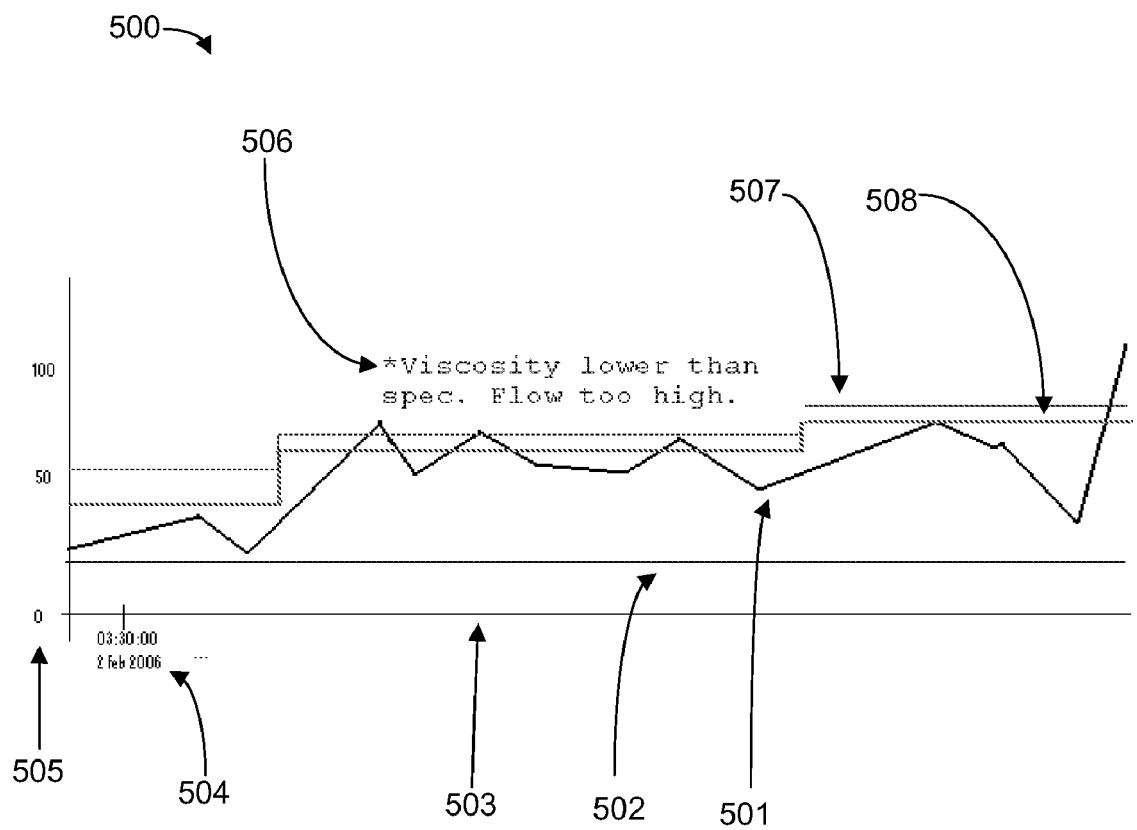
FIG. 5 illustrates an output of an analyzing apparatus.

FIG. 5 illustrates an output of an analyzing apparatus according to some embodiments. In some embodiments the output of an analyzing apparatus, such as the analyzing apparatus 103, may comprise a graph 500. The analyzing apparatus may receive an electronic file comprising a metadata portion and a data portion as described above. To graph the received data, the analyzer may parse the data portion of the electronic file using information found within the metadata portion.

The graph 500 may illustrate a value 505 of each of a plurality of data streams versus time 503. The graph 500 may display a primary data stream 501, a low limit data stream 502, a high limit data stream 507, and a target value data stream 508. The graph 500 may also illustrate one or more time stamps 504 and one or more annotations 506 such as illustrated annotation 506, "Viscosity lower than spec. Flow too high." The illustrated annotation 506 is displayed with a time stamp 504 to denote a specific time at which the annotation 506 was entered into a recording system.

Although particular embodiments have been described above, those in the art will note that various substitutions may be made to those embodiments described herein without departing from the spirit and scope of the appended claims.

What is claimed is:

1. A method comprising:
   receiving time-series data of each of a plurality of real-time data streams from one or more sensors, the plurality of real-time data streams comprising a primary data stream representing a measured value, a low limit data stream representing a low limit of the measured value, a high limit data stream representing a high limit of the measured value, and a target value data stream representing a target value of the measured value, wherein the time-series data of the primary data stream includes a plurality of time stamps and a plurality of data values that are separate from the plurality of time stamps, each of the plurality of data values of the primary data stream being associated with a respective one of the plurality of time stamps and representing the measured value, wherein the time-series data of the low limit data stream includes a plurality of data values that are separate from the plurality of time stamps and the plurality of data values of the primary data stream, each of the plurality of data values of the low limit data stream being associated with a respective one of the plurality of time stamps and representing a low limit of the measured value, wherein the time-series data of the high limit data stream includes a plurality of data values that are separate from the plurality of time stamps, the plurality of data values of the primary data stream and the plurality of data values of the low limit data stream, each of the plurality of data values of the high limit data stream being associated with a respective one of the plurality of time stamps and representing a high limit of the measured value, and wherein the time-series data of the target value data stream includes a plurality of data values that are separate from the plurality of time stamps, the plurality of data values of the primary data stream, the plurality of data values of the low limit data stream and the plurality of data values of the high limit data stream, each of the plurality of data values of the target value data stream being associated with a respective one of the plurality of time stamps and representing a target value of the measured value; and
   creating an electronic file based on the plurality of real-time data streams, the electronic file including a data portion and a metadata portion,
   wherein the metadata portion of the electronic file comprises, for each of the plurality of data streams, one or more data stream identifiers, a time range, a source type, and a data type, and
   wherein the data portion comprises the time-series data of each of the plurality of real-time data streams.

2. The method of claim 1, wherein the metadata portion comprises an annotation locator index.

3. The method of claim 2, wherein the annotation locator index is associated with one or more annotations, each annotation associated with a time stamp.

4. The method of claim 1, wherein the data portion further comprises a plurality of quality levels, and wherein each quality level is associated with a time stamp and one of the plurality of received data streams.

5. The method of claim 1, further comprising:
   transferring the electronic file from a first apparatus to a second apparatus, wherein the real-time measured data streams are received at the first apparatus.

6. The method of claim 1, further comprising:
   displaying annotations; and
   graphing the plurality of real-time data streams based on the metadata portion.

7. The method of claim 1, wherein the data portion further comprises one or more alarm indicators.

8. The method of claim 1, wherein the data portion further comprises a plurality of ascending high limit streams and a plurality of descending low limit streams.

9. A medium storing processor-executable instructions that when executed by a processor perform a method, the method comprising:
   receiving time-series data of each of a plurality of real-time data streams from one or more sensors, the plurality of real-time data streams comprising a primary data stream representing a measured value, a low limit data stream representing a low limit of the measured value, a high limit data stream representing a high limit of the measured value, and a target value data stream representing a target value of the measured value, wherein the time-series data of the primary data stream includes a plurality of time stamps and a plurality of data values that are separate from the plurality of time stamps, each of the plurality of data values of the primary data stream being associated with a respective one of the plurality of time stamps and representing the measured value, wherein the time-series data of the low limit data stream includes a plurality of data values that are separate from the plurality of time stamps and the plurality of data values of the primary data stream, each of the plurality of data values of the low limit data stream being associated with a respective one of the plurality of time stamps and representing a low limit of the measured value, wherein the time-series data of the high limit data stream includes a plurality of data values that are separate from the plurality of time stamps, the plurality of data values of the primary data stream and the plurality of data values of the low limit data stream, each of the plurality of data values of the high limit data stream being associated with a respective one of the plurality of time stamps and representing a high limit of the measured value, and wherein the time-series data of the target value data stream includes a plurality of data values that are separate from the plurality of time stamps, the plurality of data values of the primary data stream, the plurality of data values of the low limit data stream and the plurality of data values of the high limit data stream, each of the plurality of data values of the target value data stream being associated with a respective one of the plurality of time stamps and representing a target value of the measured value; and creating an electronic file based on the plurality of real-time data streams, the electronic file including a data portion and a metadata portion, wherein the metadata portion of the electronic file comprises, for each of the plurality of data streams, one or more data stream identifiers, a time range, a source type, and a data type, and wherein the data portion comprises the time-series data of each of the plurality of real-time data streams.

10. The medium of claim 9, wherein the metadata portion comprises an annotation locator index.

11. The medium of claim 10, wherein the annotation locator index is associated with one or more annotations, each annotation associated with a time stamp.

12. The medium of claim 10, wherein the data portion further comprises a quality level of each of the plurality of received data streams.

13. The medium of claim 9, wherein the method further comprises:

transferring the electronic file from a first apparatus to a second apparatus, wherein the real-time data streams are received at a first apparatus.

14. The medium of claim 13, wherein the method further comprises:

displaying annotations at the second apparatus; and
graphing the plurality of real-time data streams based on the metadata portion at the second apparatus.

15. A system comprising:

a receiver to receive time-series data of each of a plurality of real-time data streams from one or more sensors, the plurality of real-time data streams comprising a primary data stream representing a measured value, a low limit data stream representing a low limit of the measured value, a high limit data stream representing a high limit of the measured value, and a target value data stream representing a target value of the measured value, wherein the time-series data of the primary data stream includes a plurality of time stamps and a plurality of data values that are separate from the plurality of time stamps, each of the plurality of data values of the primary data stream being associated with a respective one of the plurality of time stamps and representing the measured value, wherein the time-series data of the low limit data stream includes a plurality of data values that are separate from the plurality of time stamps and the plurality of data values of the primary data stream, each of the plurality of data values of the low limit data stream being associated with a respective one of the plurality of time stamps and representing a low limit of the measured value, wherein the time-series data of the high limit data stream includes a plurality of data values that are separate from the plurality of time stamps, the plurality of data values of the primary data stream and the plurality of data values of the low limit data stream, each of the plurality of data values of the high limit data stream being associated with a respective one of the plurality of time stamps and representing a high limit of the measured value, and wherein the time-series data of the target value data stream includes a plurality of data values that are separate from the plurality of time stamps, the plurality of data values of the primary data stream, the plurality of data values of the low limit data stream and the plurality of data values of the high limit data stream, each of the plurality of data values of the target value data stream being associated with a respective one of the plurality of time stamps and representing a target value of the measured value;

a processor to:

create an electronic file based on the plurality of real-time data streams, the electronic file including a data portion and a metadata portion, wherein the metadata portion of the electronic file comprises, for each of the plurality of data streams, one or more data stream identifiers, a time range, a source type, and a data type, and wherein the data portion comprises the time-series data of each of the plurality of real-time data streams.

16. The system of claim 15, wherein the metadata portion comprises an annotation locator index.

17. The system of claim 16, wherein the annotation locator index is associated with one or more annotations, each annotation associated with a time stamp.

18. The system of claim 16, wherein the data portion further comprises a plurality of quality levels, and wherein each quality level is associated with a time stamp and one of the plurality of received data streams.

19. The system of claim 15, wherein the electronic file is to be transferred from a first system to a second apparatus, and wherein the real-time data streams are received at a first apparatus.

20. The system of claim 19, wherein annotations are displayed and the plurality of real-time data streams are graphed based on the metadata portion at the second apparatus.

21. The method of claim 1, wherein one of the plurality of data values of the primary data stream, one of the plurality of data values of the low limit data stream, one of the plurality of data values of the high limit data stream and one of the plurality of data values of the target value data stream are each associated with a particular one of the plurality of time stamps and are recorded at a time represented by the particular one of the plurality of time stamps.

22. The medium of claim 9, wherein one of the plurality of data values of the primary data stream, one of the plurality of data values of the low limit data stream, one of the plurality of data values of the high limit data stream and one of the plurality of data values of the target value data stream are each associated with a particular one of the plurality of time stamps and are recorded at a time represented by the particular one of the plurality of time stamps.

23. The system of claim 15, wherein one of the plurality of data values of the primary data stream, one of the plurality of data values of the low limit data stream, one of the plurality of data values of the high limit data stream and one of the plurality of data values of the target value data stream are each associated with a particular one of the plurality of time stamps and are recorded at a time represented by the particular one of the plurality of time stamps.

24. The method of claim 1, wherein the primary data stream is a data stream representing a measured value of a pump flow rate, a fluid level or a level of viscosity.

25. The medium of claim 9, wherein the primary data stream is a data stream representing a measured value of a pump flow rate, a fluid level or a level of viscosity.

26. The system of claim 15, wherein the primary data stream is a data stream representing a measured value of a pump flow rate, a fluid level or a level of viscosity.

27. The method of claim 21, wherein the primary data stream is a data stream representing a measured value of a pump flow rate, a fluid level or a level of viscosity.

28. The medium of claim 22, wherein the primary data stream is a data stream representing a measured value of a pump flow rate, a fluid level or a level of viscosity.

29. The system of claim 23, wherein the primary data stream is a data stream representing a measured value of a pump flow rate, a fluid level or a level of viscosity.

* * * * *